United States Patent [19]

Suketomo et al.

[11] Patent Number: 4,704,922
[45] Date of Patent: Nov. 10, 1987

[54] CONTROL APPARATUS FOR USE IN A POWER TRANSMISSION SYSTEM OF CONSTRUCTION VEHICLES

[75] Inventors: Toshitaka Suketomo, Kawasaki; Kenjiro Nezuka, Sayama, both of Japan

[73] Assignee: Kabushiki Kaisha Komatsu Seisakusho, Tokyo, Japan

[21] Appl. No.: 925,359

[22] Filed: Oct. 30, 1986

[30] Foreign Application Priority Data

Oct. 31, 1985 [JP] Japan .................. 60-242793

[51] Int. Cl.⁴ .................. B60K 41/18; F16H 47/00
[52] U.S. Cl. .................. 74/733; 74/866; 364/424.1
[58] Field of Search .......... 74/866, 733, 732; 364/424.1

[56] References Cited

U.S. PATENT DOCUMENTS

| | | | |
|---|---|---|---|
| 3,621,955 | 11/1971 | Black et al. .................. | 74/733 X |
| 3,805,640 | 4/1974 | Schneider et al. .............. | 74/733 X |
| 3,951,009 | 4/1976 | Andifferd, Jr. et al. ......... | 74/732 |
| 4,004,417 | 1/1977 | Woody et al. .................. | 60/363 |
| 4,132,132 | 1/1979 | Shaffer ........................ | 74/732 |
| 4,271,723 | 6/1981 | Shaffer ........................ | 74/732 X |
| 4,338,832 | 7/1982 | Pelligrino .................... | 364/424.1 X |
| 4,373,619 | 2/1983 | Schritt et al. ................ | 74/866 X |
| 4,485,443 | 11/1984 | Knodler et al. ................ | 364/424.1 |

FOREIGN PATENT DOCUMENTS 61-155524 7/1986 Japan .

Primary Examiner—Leslie Braun
Assistant Examiner—Dirk Wright
Attorney, Agent, or Firm—Armstrong, Nikaido, Marmelstein & Kubovcik

[57] ABSTRACT

A control apparatus for a power transmission of vehicles such as construction machine having at least one work implement actuated by a hydraulic cylinder unit, a transmission gear with hydraulically operated speed-change clutch, and a torque converter interposed between an engine and the transmission gear so as to transmit rotational power of the engine and having a hydraulically operated stator clutch. The control apparatus has two solenoid actuated clutch pressure control valves respectively provided in two hydraulic circuits which connect a hydraulic fluid supply source with the speed-change clutch and the stator clutch, respectively, so as to change the hydraulic pressure in the hydraulic circuits by the operation of a controller to which respective solenoids of the clutch pressure control valves are connected on its output part and an engine rotation sensor, a pressure sensor for detecting the pressure in the hydraulic cylinder unit of the work implement and a speed-change lever position sensor for detecting the shift of the lever to its first speed position are connected on its input part.

4 Claims, 10 Drawing Figures

CONTROL APPARATUS FOR USE IN A POWER TRANSMISSION SYSTEM OF CONSTRUCTION VEHICLES

BACKGROUND OF THE INVENTION

1. Field of the Invention

This invention relates to a control apparatus for use in a power transmission system of construction vehicles, and more particularly to a control apparatus for a power transmission of construction vehicles such as, for example, a wheel loader or the like, the vehicles having a power transmission system in which a torque converter with a hydraulically actuatable or engageable stator clutch and a transmission gear adapted to effect speed change by means of a hydraulically engageable and disengageable clutch are equipped, and further having at least a work implement such as a hydraulically actuatable bucket or the like.

2. Description of the Prior Art

In the conventional power transmission system for construction vehicles of the kind specified, an actuating unit for a stator clutch of a torque converter and a speed change clutch of a transmission gear are connected through directional control valves or selector valves respectively installed in their hydraulic circuits with a hydraulic fluid supply source, and the arrangement is made such that the power transmission gear is controlled by changing over each selector valve properly to change the running speed of the vehicle.

In the above-mentioned conventional construction vehicle such as, for example, a wheel loader or the like, acceleration of the engine is normally made by the operator depending on the load applied to the bucket during excavation so as not to cause slipping of tire-wheels; however, in many case, this operation requires skilled technique for excavating different objects.

Stating in brief, in case excavation work is carried out by a wheel loader having a fixed displacement torque converter, if the bucket is subjected to a sufficient load from the object being excavated during the excavation work, slip of tire-wheels does not occur even when the engine is run under fully open throttle condition, whilst the load is lower than a predetermined value, slip of the tire-wheels occurs thus causing wear of them.

Further, some of such wheel loaders equipped with a variable displacement type torque converter for the purpose of preventing slip of tire-wheels. However, this arrangement is incapable of rendering the displacement variable in accordance with the load imposed on the bucket, and if the displacement is set at a lower value to prevent slip of tire-wheels, the tire-wheel driving force becomes insufficient under the maximum bucket loading condition.

FIGS. 1 to 3 are views for explaining the above-mentioned problem, wherein W denotes the vehicle weight; $W_F$ the load on front wheels; $W_R$ the load on rear tire-wheels; F the load on the bucket; $\mu$ the frictional coefficient of the road surface, and $\mu(W_F+W_R)$ which is the critical tangent force for tire-wheel slip.

FIG. 2 shows the relationship between the load applied to the bucket, the critical tangent force for tire-wheel slip and the tire-wheel driving force. In this drawing, reference character "X" denotes the tire-wheel driving force obtained when a torque converter of fixed displacement type is used. In this case, when the bucket is subjected to a low load, slip of tire-wheels occurs in the zone designated by an oblique line thus causing ineffective power consumption and accelerated wear of tire-wheels. Further, under the maximum bucket loading condition, the tire-wheel driving force reaches a point $C_1$ causing a shortage in driving force.

Whilst, if a torque converter of variable displacement type is used and set at an original point "a" for critical tangent force for tire-wheel slip so as not to cause slip of tire-wheels, then the tire-wheel driving force diagram shown by reference character Y is obtained. In this case too, under the maximum bucket loading condition, the tire-wheel driving force reaches the point "c" causing a shortage in driving force.

FIG. 3 is a diagram showing the relationship between the engine's rotating speed and the torque applied to the engine output shaft.

In order to alleviate the above-mentioned problems, it is required for the operator to make adjustment by means of the accelerator so as not to cause slip of tire-wheels.

The U.S. Pat. No. 4,004,417 discloses, as one of measures to solve the above-mentioned problems in the conventional construction vehicles, provision of a slipping clutch between the output shaft of the engine and the impeller of the torque converter to accurately transmit a driving force required by the tire-wheels upon transmission of the driving force produced by the engine through the torque converter, the slipping clutch being arranged to be controlled precisely. However, the aforementioned problems cannot be effectively solved only by the control of the slipping clutch, since the conditions such as the vehicle speed and loading applied to the work implement need to be taken into consideration at the same time.

SUMMARY OF THE INVENTION

The present invention has been contemplated in view of the above-mentioned circumstances of the conventional construction vehicles, and for its object to provide a control apparatus for use in a power transmission system for construction vehicles arranged such that the fluid pressure in a stator clutch of a torque converter and that in a speed change clutch of a transmission gear are automatically controlled in response to the magnitude loading without having to make adjustments for the operator by means of accelerator, thereby preventing slip of tire-wheels under low load condition to thereby achieve prolonged life-time of tire-wheels, and under such a low load condition the fluid pressure in the speed change clutch is reduced to thereby reduce the loss in the power for driving the hydraulic fluid supply source i.e. reduce the energy loss and achieve a reduction in fuel consumption.

To achieve the above-mentioned object, according to the present invention, there is provided a control apparatus for use in a power transmission system of construction vehicles, comprising at least one work implement adapted to be actuated by a hydraulically driven actuator means, a transmission gear adapted to be actuated by a speed change clutch means, and a torque converter interposed between an engine and the transmission gear so as to transmit the power for rotation generated by the engine to the transmission gear and having a stator clutch, characterized in that the control apparatus comprises a hydraulic fluid supply source; a first and a second solenoid actuated clutch pressure change-over valves connected with two hydraulic circuits which connect the hydraulic fluid supply source with the speed change clutch means and the stator clutch, respectively, the first and second clutch pressure change-over valves being adapted to change the fluid pressure in the hydraulic circuits over to a high value and a low value; an engine rotation sensor connected on the output side thereof with respective solenoids of the first and second clutch pressure change-over valves, respectively, and adapted to detect the rotational speed of the engine; a pressure sensor adapted to detect the fluid pressure in the hydraulically driven actuator means; a speed-change lever position sensor adapted to detect the shift of the speed-change lever to its first speed position; and a controller connected on the input side thereof with the engine rotation sensor, the pressure sensor and the speed-change lever position sensor, wherein the first and second clutch pressure change-over valves are controlled in response to the input signal from their respective sensors.

In the above described control apparatus, the first clutch pressure change-over valve connected with the hydraulic circuit for the speed change clutch means is connected on the downstream side thereof with a high pressure relief valve and a low pressure relief valve which are connected in parallel to each other, and further the hydraulic circuit for the stator clutch disposed downstream of these relief valves is connected with the second clutch pressure change-over valve.

In the above-mentioned control apparatus, the controller comprises an engine rotational speed detecting circuit adapted to receive a signal from the engine rotation sensor; an A/D converter circuit adapted to receive a signal from the pressure sensor; a speed-change lever position detecting circuit adapted to receive a signal from the speed-change lever position sensor; a central processing unit (referred to simply as CPU below) adapted to process the output signal from the above-mentioned three circuits, a program memory for comparing the value obtained by operation of the CPU with a predetermined value; a first output circuit adapted to transmit a TURN-ON signal or a TURN-OFF signal to the solenoid of the first clutch pressure change-over valve in response to the output signal from the CPU; and a second output circuit adapted to transmit a TURN-ON signal or a TURN-OFF signal to the solenoid of the second clutch pressure change-over valve in response to the output signal from the CPU.

Still further, in the above-mentioned control apparatus, the first and second output circuits are independent with each other so as to be rendered operative with a predetermined time delay, the arrangement being made such that when the output circuits are both turned ON, the stator clutch is rendered operative earlier than the speed-change clutch means and when the output circuits are both turned OFF the speed-change clutch means is rendered operative earlier than the stator clutch.

The above and many other advantages, features and additional objects of the present invention will become apparent to those versed in the art upon making reference to the following description and accompanying drawings in which preferred structural embodiments incorporating the principles of the present invention are shown by way of illustrative example.

DETAILED DESCRIPTION OF THE INVENTION

The control apparatus for use in a power transmission system of a wheel loader or the like according to the present invention will be described below with reference to FIGS. 4 to 9.

Figure 1:
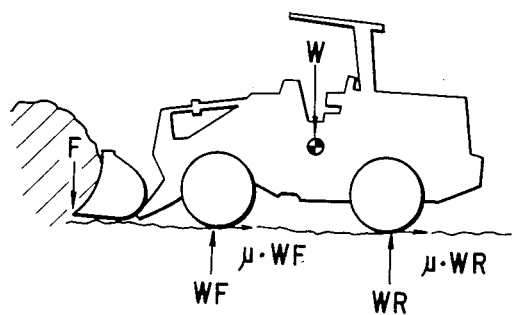
FIG. 1 is an explanatory view showing the load distribution relative to load applied to the bucket in the conventional construction vehicle such as, for example, a wheel loader.
Figure 2:
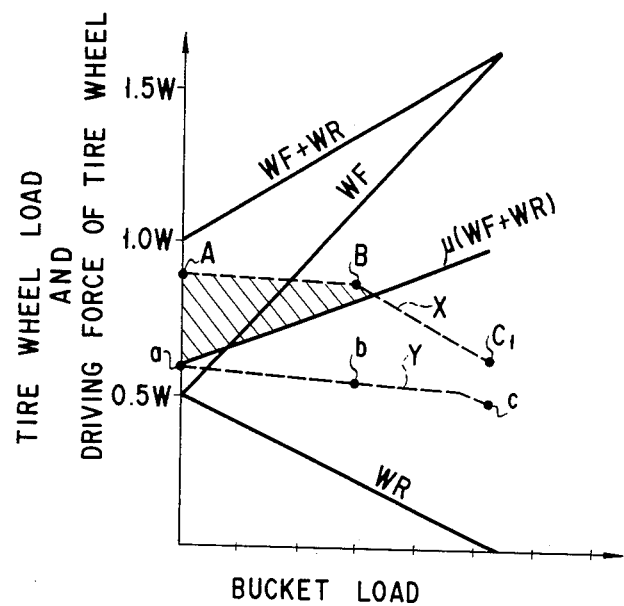
FIG. 2 is a diagram showing the load and the tire-wheel driving force relative to the load applied to the bucket in the prior art example.
Figure 3:
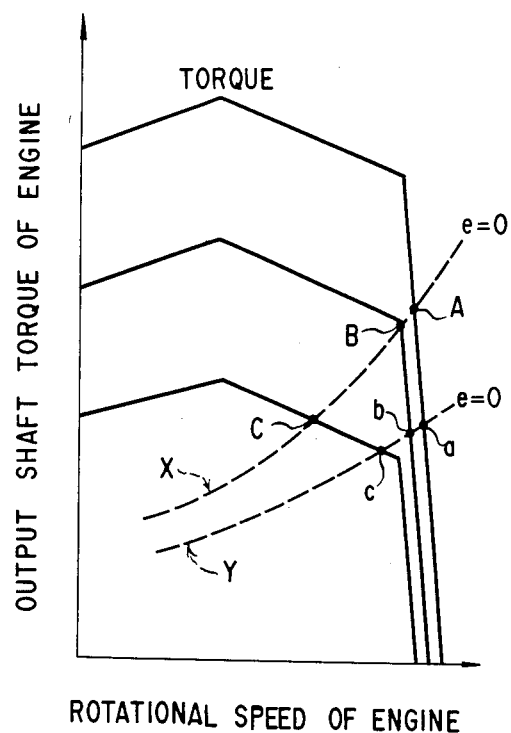
FIG. 3 is a diagram showing the relationship between the engine rotational speed and the torque applied to the output shaft of the engine.
Figure 4:
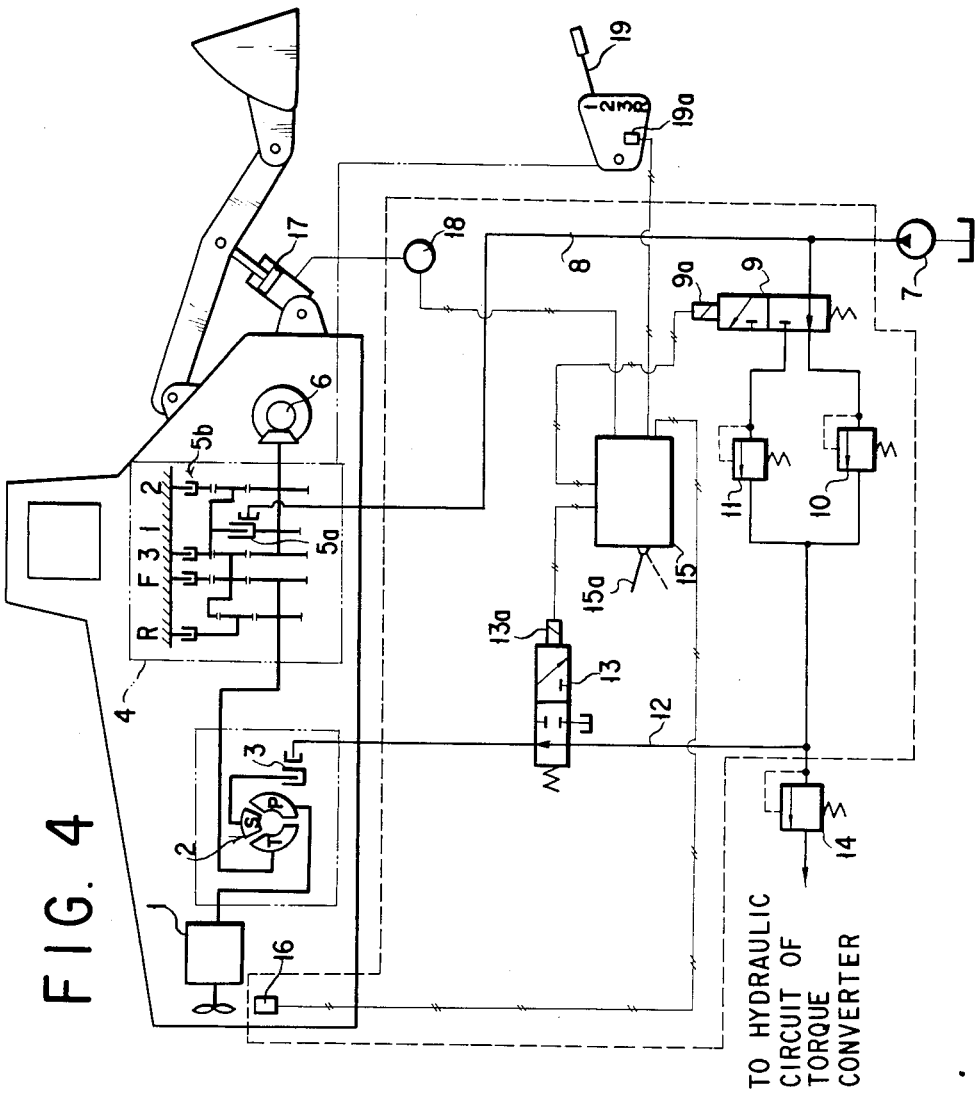
FIG. 4 shows an overall schematic configuration of one embodiment of control apparatus for use in a power transmission system according to the present invention.

In FIG. 4, reference numeral 1 denotes an engine; 2 a torque converter having a stator clutch 3 adapted to be actuated by a hydraulic force; 4 a transmission gear adapted to effect speed change by a speed-change clutch 5a and a group of speed-change brakes 5b arranged to be actuated by a hydraulic force in response to the operation of a speed change lever 19, and 6 an axle, all of which form a power transmission system for use in a wheel loader or the like.

The above-mentioned stator clutch 3 and the speed-change clutch 5a are connected, respectively, with the hydraulic fluid supply source 7. In this hydraulic circuit, a speed-change clutch circuit 8 connected to the speed-change clutch 5a is connected through a speed-change clutch pressure change-over or control valve 9 with a high pressure relief valve 10 and a low pressure relief valve 11 which are connected in parallel to each other. The high and low pressure relief valves 10 and 11 are connected on the downstream thereof with a stator clutch circuit 12 which is, in turn, connected with the aforementioned stator clutch 3. This stator clutch circuit 12 has a stator clutch pressure change-over or control valve 13 interposed therein for turning ON or OFF the pressurized fluid for the stator clutch 3. Further, a pressure regulating valve 14 is connected with the stator clutch circuit 12.

The above-mentioned speed-change clutch pressure change-over valve 9 and stator clutch pressure change-over valve 13 are of a solenoid actuated type having solenoids 9a and 13a, respectively, which are connected with the outputs of the controller 15.

The input unit of the controller 15 is connected with an engine rotation sensor 16 adapted to detect the number of revolutions of the engine 1, a pressure sensor 18 adapted to detect the fluid pressure in a hydraulic actuator such as, for example, a hydraulic cylinder 17, and a first speed sensor 19a adapted to detect the first speed position of a speed-change lever 19.

Figure 5:
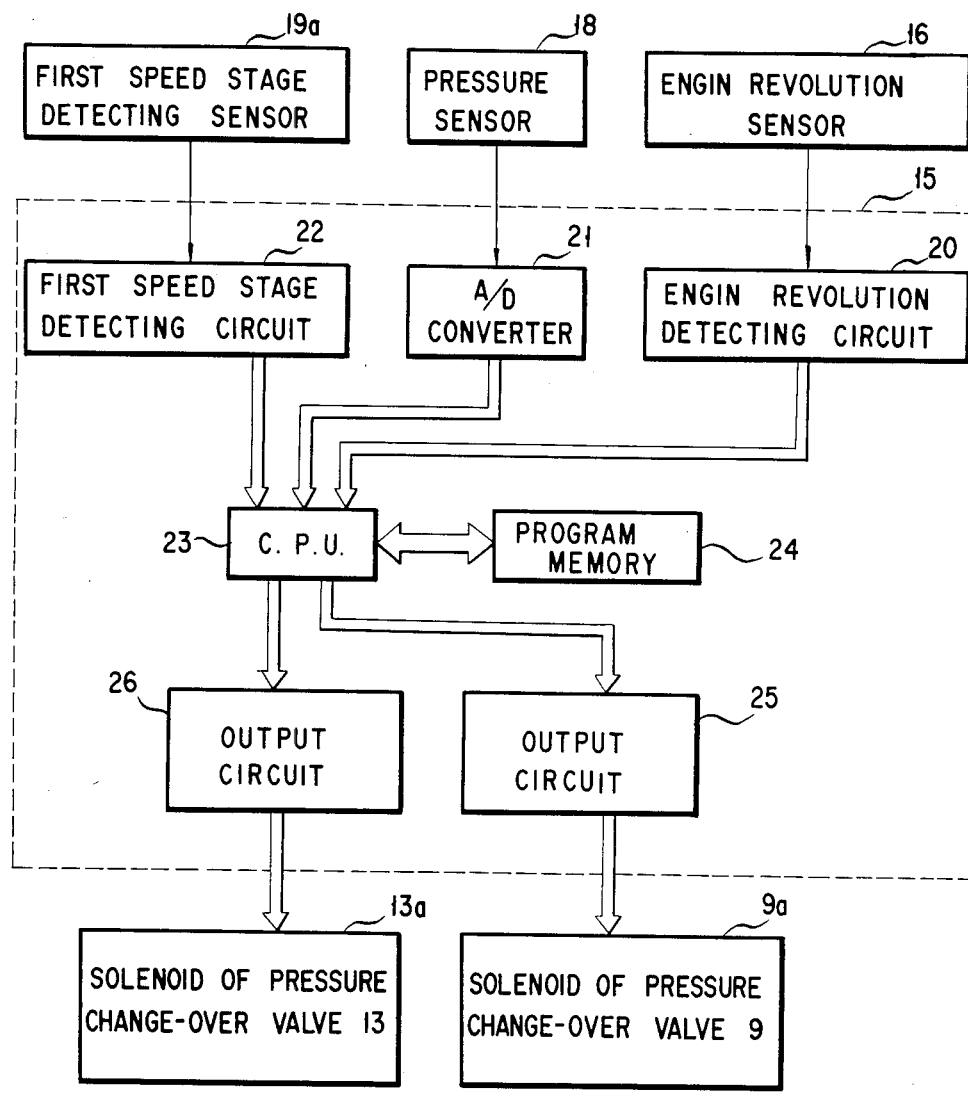
FIG. 5 is a block diagram showing the schematic configuration of a controller for use in the control apparatus for power transmission according to the present invention.

The above-mentioned controller 15 has a microcomputor contained therein, and its configuration is as shown in FIG. 5. The controller 15 comprises an engine rotation detecting circuit 20 adapted to receive a signal from the engine rotation sensor 16, an analog-digital (A/D) converter circuit 21 adapted to receive a signal from the pressure sensor 18; a first speed detecting circuit 22 adapted to receive a first speed detection signal from the first speed sensor 19a; a central processing unit (CPU) 23 for processing the signals from the circuits 20, 21 and 22; a program memory 24 for comparing the value obtained by operation of the CPU 23 with a predetermined value; an output circuit 25 adapted to transmit a TURN-ON signal or a TURN-OFF signal to the solenoid 9a of the speed-change clutch pressure changeover valve 9 in response to the signal from the CPU 23; and an output circuit 26 adapted to transmit a TURN-ON signal or a TURN-OFF signal to the solenoid 13a of the stator clutch pessure change-over valve 13.

Further, the circuit 25 adapted to transmit a signal to the solenoids 9a of the speed-change clutch pressure change-over valve 9 and the circuit 26 adapted to transmit a signal to the solenoid 13a of the stator clutch pressure change-over valve 13 are independent with each other so as to be rendered operative with a predetermined time delay.

Further, in the control apparatus according to the present invention, the arrangement is made such that when the output circuits 25 and 26 are both turned ON, the stator clutch is rendered operative earlier than the speed-change clutch means, whilst when the output circuits 25 and 26 are both turned OFF, the speed-change clutch means is rendered operative earlier than the stator clutch.

The operation of the control apparatus of the present invention constructed as mentioned above will be described below:

(1) When a switch 15a of the controller 15 is turned ON, the engine rotation detecting circuit 20 adapted to receive a signal from the engine rotation sensor 16, the A/D converter circuit 21 adapted to receive a signal from the hydraulic cylinder pressure sensor 18, and the first speed detection circuit 22 adapted to receive a signal from the first speed sensor 19a are rendered operative to transmit the signals to the CPU 23.

(2) The CPU 23 will check whether the above-mentioned signals meet the following conditions.
(a) Is the fluid pressure in the hydraulic cylinder 17 less than a predetermined value $P_1$ ?
(b) Has the speed change lever 19 shifted to the first speed position ?
(c) Is the engine rotational speed more than a predetermined value $N_1$ ?

(3) In case all the above conditions are met, the following procedures need to be taken:
(a) Actuate the stator clutch pressure change-over valve 13 so as to reduce the displacement of the torque converter 2.
(b) Actuate the speed-change clutch pressure change-over valve 9 so as to reduce the speed-change clutch pressure. Further, if either one of the following three signals meets the requirement, the operating condition indicated in (3) above is released.
(a) The fluid pressure in the bucket cylinder 17 is more than a predetermined value $P_2$. (but, $P_2 > P_1$)

(b) The speed change lever 19 is shifted to other speed positions than the first speed position.
(c) The engine rotational speed is lower than a predetermined value $N_2$, (but, $N_2 < N_1$)

The above-mentioned operation is conducted when the switch 15a of the controller 15 is turned on. However, for special operations, when it is required to maintain the displacement of the torque converter even under light bucket loading condition, it is only necessary to turn the abovementioned switch 15a OFF to render the controller 15 inoperative.

Figure 6:
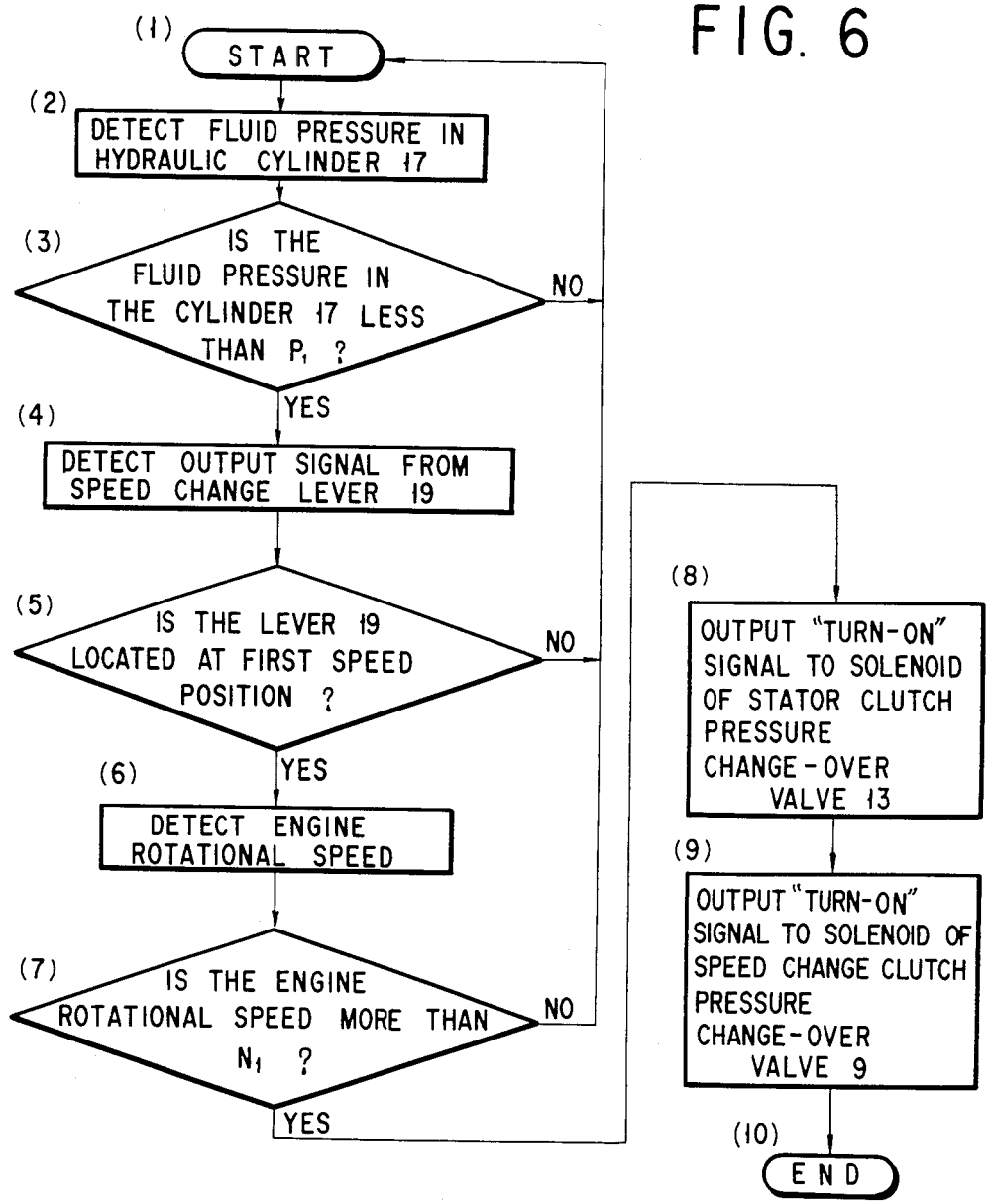
FIGS. 6 and 7 are flow charts for explaining the operation of the controller shown in FIG. 5.
Figure 7:
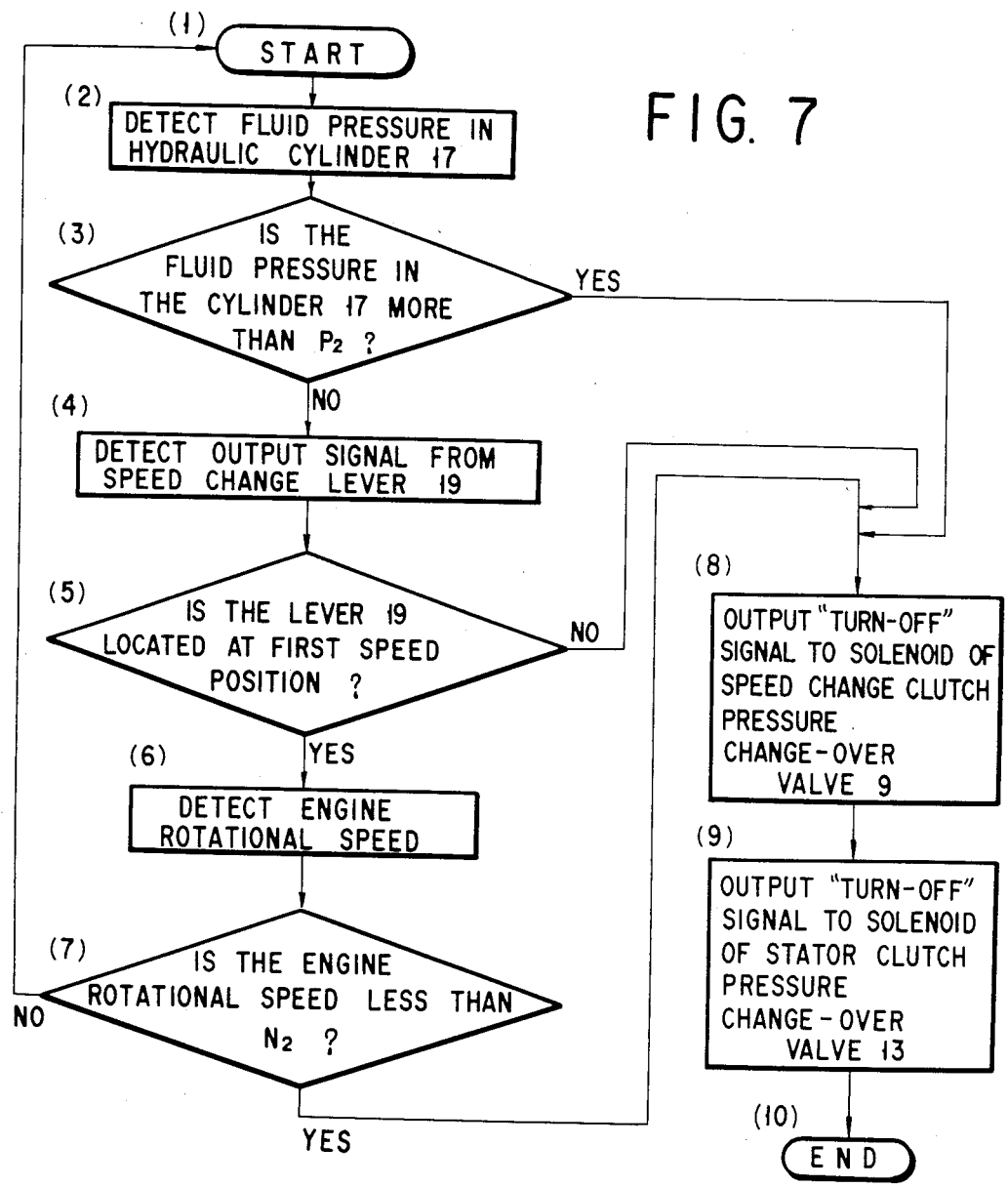

FIGS. 6 and 7 are flow charts showing the operation of the controller 15. Further, FIG. 6 shows the operation of the controller 15 which starts from the ordinary condition, whilst FIG. 7 shows the operation of the controller 15 from the operating condition to the released condition.

In FIG. 6, blocks (2) to (7) indicate checks for operating conditions, and (8) and (9) indicate actuation. Whilst, in FIG. 7, blocks (2) to (7) indicate checks for release conditions, and (8) and (9) indicate release.

As can be seen from both the flow charts, in the process of transfer to the operation shown in FIG. 6, the solenoid 13a of the stator clutch pressure change-over valve 13 receive a TURN-ON signal earlier than the time when the solenoid 9a of the speed-change clutch pressure change-over valve 19 receives a TURN-ON signal. Whilst, in the process of returning to the release condition shown in FIG. 7, the above-mentioned signal output sequence is reversed thereby protecting the speed-change clutch 5a.

Figure 8A:
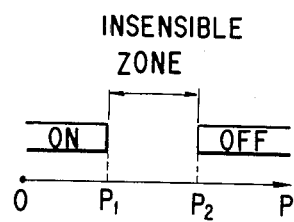
FIGS. 8A and 8B are diagrams for explaining the operation range of the controller relative to changes in engine rotational speed and in fluid pressure in the actuator for work implements.
Figure 8B:
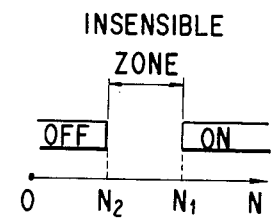

Further, as regards the conditions required for actuation, i.e., (1) the fluid pressure in the hydraulic cylinder is less than $P_1$ and (2) the engine rotational speed is more than $P_2$, and those required for release, i.e., (3) the above-mentioned fluid pressure is more than $P_2$ and (4) the engine rotational speed is less than $N_2$, there is a difference in value between $P_1$ and $P_2$, and also $N_1$ differs in value from $N_2$. As a result, as shown in FIGS. 8A and 8B, an insensible zone is created between $P_1$ and $P_2$ and also between $N_1$ and $N_2$, and so oversensitive control operation is not produced by changes in the engine rotational speed and the load applied to the hydraulic cylinder 17 for work implement.

Figure 9:
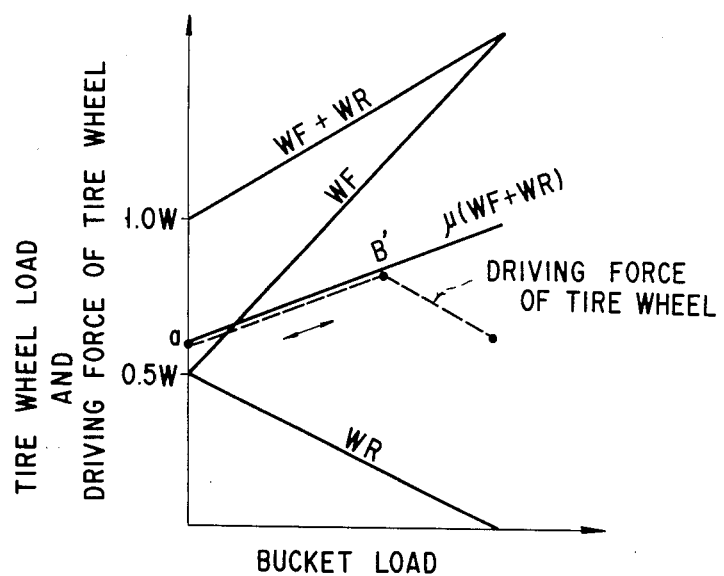
FIG. 9 is a diagram showing the load distribution relative to the load applied to the bucket in a wheel loader provided with a control apparatus for use in a power transmission system according to the present invention.

According to the present invention, when the speed-change lever 19 is located at its first speed position and the engine rotational speed is more than a predetermined value $N_1$, and if the bucket is subjected to a low load, the displacement of the torque converter 2 is automatically reduced, whilst as shown in FIG. 9, the tire-wheel driving force will change along the critical tangent force $\mu$ ($W_F + W_R$) for tire-wheel slip to a point B' to thereby prevent occurrence of slip of tire wheels under a low load condition and enable the life time of tire-wheels to be prolonged. Further, the fluid pressure in the speed-change clutch 5a is lowered at the same time thus reducing the loss in driving, i.e., energy loss and improving the fuel consumption rate.

Further, when the bucket is subjected to a heavy load, the displacement of the torque converter 2 is increased to such an extent that a driving force enough for excavation work can be obtained.

Since both the above-mentioned control operations are made automatically, it is unnecessary for the operator to make adjustments by means of the accelerator, and excavation work by means of a wheel loader can be carried out easily.

It is to be understood that the foregoing description is merely illustrative of a preferred embodiment of the present invention, and that the scope of the invention is not to be limited thereto, but is to be determined by the scope of the appended claims.

What is claimed is:

1. A control apparatus for use in a power transmission system of construction vehicles, comprising at least one work implement adapted to be actuated by a hydraulically driven actuator means, a transmission gear adapted to be actuated by a speed-change clutch means, and a torque converter interposed between an engine and said transmission gear so as to transmit the power for rotation generated by the engine to the transmission and having a stator clutch, characterized in that the control apparatus comprises a hydraulic fluid supply source; a first and a second solenoid actuated clutch pressure change-over valves connected with two hydraulic circuits which connect the hydraulic fluid supply source with the speed-change clutch means and said stator clutch, respectively, said first and second clutch pressure change-over valves being adapted to change the fluid pressure in said hydraulic circuits over to a high value and a low value; an engine rotation sensor connected on the output side thereof with respective solenoids of the first and second clutch pressure change-over valves, respectively, and adapted to detect the rotational speed of the engine; a pressure sensor adapted to detect the fluid pressure in the hydraulically driven actuator means; a speed-change lever position sensor adapted to detect the shift of the speed-change lever to its first speed position; and a controller connected on the input side thereof with said engine rotation sensor, said pressure sensor and said speed-change lever position sensor, wherein said first and second clutch pressure change-over valves are controlled in response to the input signal from their respective sensors.

2. The control apparatus as claimed in claim 1, characterized in that said first clutch pressure change-over valve connected with the hydraulic circuit for said speed-change clutch means is connected on the downstream side thereof with a high pressure relief valve and a low pressure relief valves which are connected in parallel to each other, and the hydraulic circuit for said stator clutch disposed downstream of said relief valves is connected with said second clutch pressure changeover valve.

3. The control apparatus as claimed in claim 1, characterized in that said controller comprises an engine rotational speed detecting circuit adapted to receive a signal from the engine rotation sensor; an A/D converter circuit adapted to receive a signal from the pressure sensor; a speed-change lever position detecting circuit adapted to receive a signal from the speed-change lever position sensor; a central processing unit adapted to process the output signals from said three circuits; a program memory for comparing the value obtained by operation of the central processing unit with a predetermined value; a first output circuit adapted to transmit a TURN-ON signal or a TURN-OFF signal to the solenoid of said first clutch pressure change-over valve in response to the output signal from the central processing unit; and a second output circuit adapted to transmit a TURN-ON signal or a TURN-OFF signal to the solenoid of said second clutch pressure change-over valve in response to the output signal from the central processing unit.

4. The control apparatus as claimed in claim 3, characterized in that said first and second output circuits are independent with each other so as to be rendered operative with a predetermined time delay, the arrangement being made such that when said output circuits are both turned ON, said stator clutch is rendered operative earlier than the speed-change clutch means, and when the output circuits are both turned OFF the speed-change clutch means is rendered operative earlier than the stator clutch.

* * * * *